United States Patent Office 3,453,853
Patented July 8, 1969

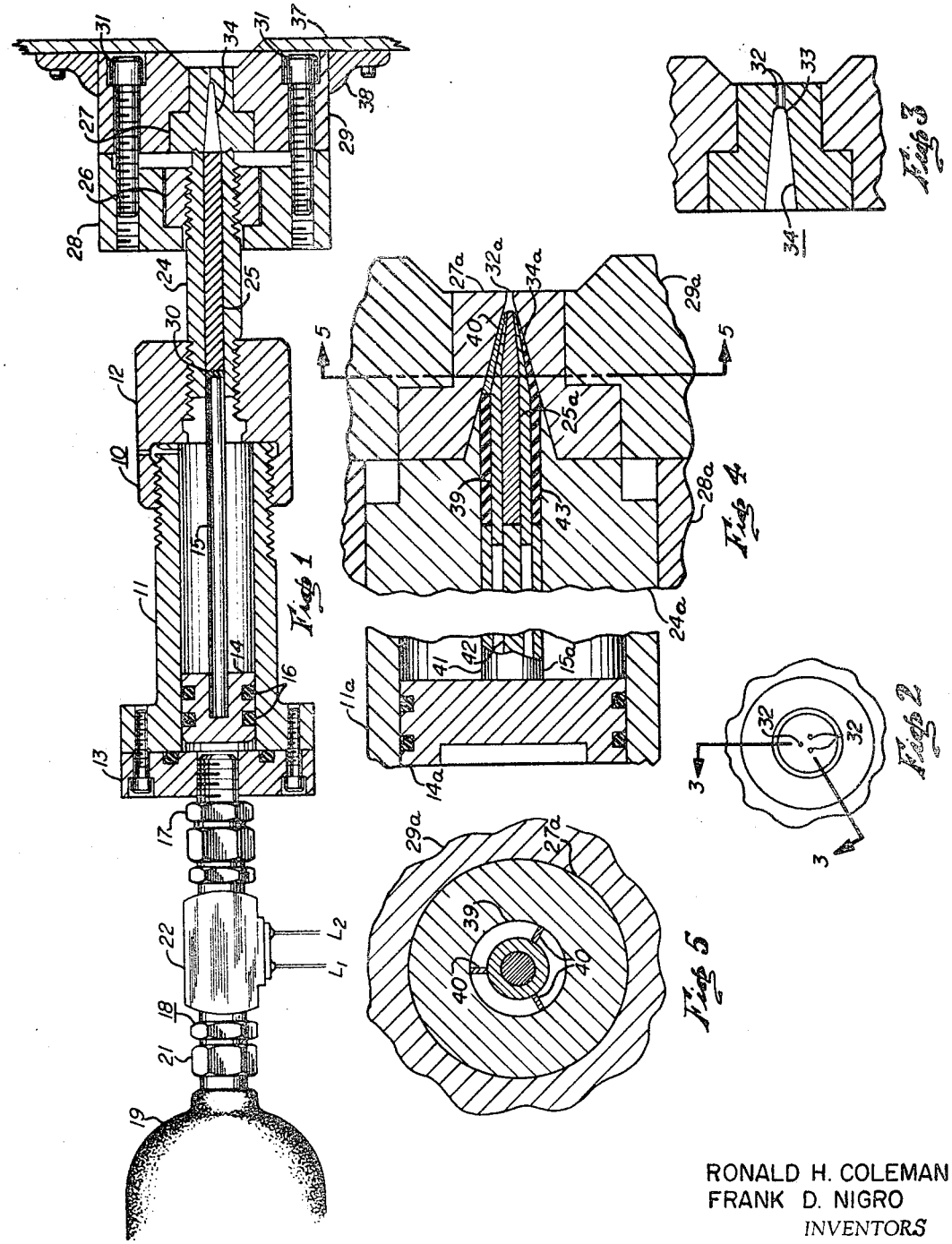

3,453,853
TARGET GENERATING DEVICE
Ronald H. Coleman, Andover, and Frank D. Nigro, Arlington, Mass., assignors to Avco Corporation, Cincinnati, Ohio, a corporation of Delaware
Filed Sept. 27, 1965, Ser. No. 491,507
Int. Cl. B21c 23/00; G01s 7/36, 7/42
U.S. Cl. 72—253                                    16 Claims

ABSTRACT OF THE DISCLOSURE

The disclosure is directed to apparatus and method for making passive dipoles for use as reflectors of electromagnetic energy. A charge of extrudable material is placed in a housing. The housing includes a piston for extruding the charge through a passage defined in the housing to form stringlike members outside of the housing. These long thin members act as passive reflectors to electromagnetic energy.

---

This invention relates to an airborne device for generating lightweight targets while in flight, and more particularly to a device and method of producing targets of this type in situ.

Many applications exist wherein it is highly desirable that an aircraft, space vehicle or the like be provided with means for breaking the track of a following radar. One such application occurs in the design of missles and other covert military weapons, which are susceptible of tracking and disclosure through the use of electronic equipment, such as radar.

Heretofore, it has been suggested that this be accomplished by the use of discrete length, resonant dipoles in the form of thin metallic wires commonly referred to as "chaff." The prior art method involves carrying the chaff aloft with the vehicle, and releasing the material on a predetermined signal initiated from the vehicle or from the ground. An objectionable feature to this method is the additional space required in the vehicle to carry the chaff material in the loosely packaged form, and the resultant additional weight of the vehicle and increased requirements of the propulsion system necessary to provide this space.

The present invention is directed to a device which generates the chaff material in the form of a lightweight resonant dipole of controllable dimensions, and expels the material from the vehicle while airborne.

The invention therefore has as an object to provide a method for generating a lightweight target material in situ in an aircraft or space vehicle.

A further object of the invention is to provide a device which is used in an aircraft or space vehicle, which device generates a lightweight target.

Another object of the invention is to provide a device for generating a lightweight target material and expelling it from an aircraft or missile which device is lightweight, simple in operation and has few moving parts.

While a further object of the invention is to provide a method and means for producing a lightweight resonant dipole of metallic material having an insulated covering.

Other and further objects of the invention will become readily apparent from the following description and claims when considered in connection with the accompanying drawings, in which:

FIGURE 1 is an elevational view, partially in section, showing a device for generating lightweight targets, constructed in accordance with the present invention;

FIGURE 2 is an elevational view showing an element of the invention in detail;

FIGURE 3 is a sectional view taken along the lines 3—3 of FIGURE 2 showing the construction of FIGURE 2 on an enlarged scale for greater detail;

FIGURE 4 is a fragementary elevational view, partially in section, showing an alternate embodiment of the device shown in FIGURE 1; and FIGURE 5 is a fragmentary sectional view taken along the lines 5—5 of FIGURE 4, and shown on an enlarged scale for clarity.

Briefly, in practicing the present invention, a device for extruding a metallic substance is mounted adjacent an outer wall of a vehicle. The device carries its own power supply and is activated by an electrical solenoid valve, or other means, which may be remotely controlled.

In operation, the device is sent aloft in the vehicle loaded with a charge of material, and upon a predetermined signal the material is extruded by the device to form a thin wire or wires which are expelled from the vehicle in a form effective as a target, or for the purpose of breaking a radar track.

While the device may be useful for extruding metallic dipoles in outer space, it will be obvious to the reader that such metallic dipoles, specifically of the material discussed therein, will vaporize upon entry into the earth's atmosphere. The invention therefore, provides a device which in addition to extruding a thin metallic wire which is expelled from the vehicle, serves to extrude a layer of insulating material covering the wire. This embodiment of the invention is useful where it is desired to have the thin dipole remain in the atmosphere, as the insulating material serves to shield the wire from reentry heat.

Referring to the drawings, especially FIGURE 1, there is shown a target generating device 10 in the form of an extruder having a cylinder 11, provided with end caps 12 and 13.

The cylinder 11 contains a relatively tight-fitting piston 14 to which is mounted a piston rod 15. The piston 14 is disposed for slidable movement within the cylinder 11, and is suitably provided with O-rings 16 for sealably engaging the piston against the inner wall of the cylinder 11.

The end cap 13 is connected by a fitting 17 to one end of a piping arrangement generally designated by the numeral 18. A high-pressure storage vessel 19, is connected to the opposite end of the piping arrangement 18 by a suitable fitting 21.

The pressure in the vessel 19 is maintained, and subsequently released, through an electrically actuated solenoid valve 22 disposed in the piping arrangement and connected to an electric circuit formed by the lines $L_1$ and $L_2$ which are energized by a suitable means (not shown).

Referring still to FIGURE 1, the end cap 12 has threadedly received therein a charge housing 24. The charge housing 24 is shown in the loaded condition and contains a charge 25 of metallic material, suitable for extruding.

The housing 24 has one end threadedly received in a bearing block 26, and is disposed in sealing contact with a removable nozzle 27.

As shown, charge housing 24 and the nozzle 27 are forced into sealing engagement by a pair of clamp members 28 and 29. A plurality of fasteners 31 serves to force the clamp members 28 and 29 together, the clamp member 28 bearing against the block 26 and the clamp member 29 bearing against the nozzle 27.

Referring now to FIGURES 2 and 3, the nozzle 27 is shown to have a plurality of openings in the form of orifice passages 32 communicating between the inner and outer surfaces of the nozzle. Although three passages 32 are shown in the present device, the number may be more, or less, depending on the number of dipole wires to be simultaneously extruded.

Each orifice 32 is of equal diameter and is shown equally spaced from the center line of the nozzle 27, and extends through the spherical portion 33 of the nozzle interior wall generally designated as 34. The three passages 32 therefore, are of equal length and diameter insuring equal flow through each when the metal is forced against spherical portion 33 by the piston 14 acting through the rod 15. The nozzle enclosure 34 has a sharply tapered portion 35 which terminates at the spherical portion 33.

In addtion, a free piston 30 of polymer type material is inserted between the rod 15 and the charge 25. This free piston 39 expands under pressure and serves to seal the charge from travelling in the reverse direction past the piston rod.

Referring to FIGURES 4 and 5, there is shown an alternate embodiment of the device of FIGURE 1 wherein like elements have been given like reference numerals with the additional suffix "a."

The device shown in this embodiment comprises a cylinder 11a housing a piston 14a which is connected to a cylindrical-shaped piston rod 15a. The piston rod 15a extends into a charge housing 24a which is engaged at one end to a nozzle 27a.

The nozzle 27a in exterior appearance is similar to the nozzle 27 of FIGURE 1 and may be held in place in a similar manner by clamp members 28a and 29a, as shown.

It will be noted that the interior of the housing 24a has disposed therein a tubular member 39 which extends axially through the housing 24a and into the interior of the nozzle 27a. The tubular member is supported in the housing 24a by a plurality of fins 40 which extend radially from the external surface of the tubular member, and contact the interior wall 34a of the nozzle 27a. The tubular member 39 is generally a separate element which is not structurally attached to the nozzle 27a, but is oriented by contact between the fins 40 and the wall 34a to properly align with the piston rod 15a.

The piston rod 15a comprises an outer hollow cylindrical portion 41 and an inner solid cylindrical portion 42 in spaced relation. The piston rod 15a is constructed such that the inner surface of the cylindrical portion 41 surrounds the outer surface of the tubular member 39 and the solid cylindrical portion 42 is received in interfitting engagement in the interior of the tubular member 39. The tubular member 39 therefore provides means for separating the interior of the housing 24a into two separate and distinct charge-holding areas. In practice, the area defined by the interior of the member 39 is loaded with a charge of extrudable metallic material 25a while the area adjacent the exterior surface of the member 39 is loaded with a charge of extrudable insulating material 43, to achieve a desired result.

*Operation*

Referring back to FIGURE 1, the extruding device 10 is generally placed in the space vehicle or aircraft adjacent a skin surface 37 which is open to the ambient. The device 10 may be held in place by a flange 38 or any other suitable fastening means.

The device 10 is placed in the vehicle with the vessel 19 fully charged with fluid (for example air) under pressure, and the charge housing 24 loaded with the charge 25.

The charge 25 may be any one of a number of known materials exhibiting favorable properties for extrusion. Pure indium has been successfully employed for this application. However, aluminum, lead and tin are other materials which, in the pure state or as alloys, provide good charge material.

The charge 25 also may be chosen as a single cylindrical metallic piece for extruding a continuous length of chaff material, or may comprise a plurality of disks having intermittent layers of separating material therebetween for producing intermittent lengths of chaff.

In loading the device 10, the charge housing 24 is disengaged from the end cap 12 and the charge 25 inserted in the housing. The free piston 30 is then placed on the charge 25 and the housing 24 is reengaged in the end cap 12 with the rod 15 entered into the housing. The device, now loaded, is located in the vehicle in the manner shown, with the valve 22 in the closed position.

During vehicle flight, when it is desirable to release the chaff material from the vehicle, the valve 22 is actuated to the open position releasing pressure to the cylinder 11. The pressure drives the piston 14 and rod 15 into the housing 24 extruding charge 25 through the openings 32 at a rapid velocity.

The device 10 may be used singly or there may be a number of such devices provided in the vehicle for producing multiple targets.

In the device depicted in FIGURE 1, the storage vessel contains a gaseous fluid at a pressure of 1,800 p.s.i., a sufficient magnitude to provide a pressure of approximately 30,000 p.s.i. on the charge 25.

This is accomplished by providing a ratio in cross-sectional area between the piston 14 and the piston rod 15 of about 16 to 1, thereby magnifying the pressure available from the vessel 19.

The other features of the device include an angle of approximately 7° slope between the wall 35 and the axis of the nozzle opening 34, together with the minute openings provided by each passage 32 which combine to accomplish a total cross-sectional area change of 1,370 to 1.

In tests conducted on the device, pure indium has been extruded in continuous lengths to 85 feet. These lengths have been extruded at varying velocities, dependent on the diameter of the chaff produced.

Small lengths of wire, .012 inch in diameter, have been ejected at velocities in excess of 400 feet per second, while wire having a diameter of .007 inch has been ejected at velocities in excess of 500 feet per second and wire .005 inch in diameter has been ejected at a velocity greater than 750 feet per second.

In operation, the embodiment of FIGURE 4 serves to provide a slender dipole of metallic material which is covered by an insulated coating. The device operates in a similar manner to that of FIGURE 1 to extrude material and expel it to the ambient. As the piston 14a travels through the cylinder 11a, the piston rod 15a is serving to extrude two distinct materials through the orifice 32a. The metallic charge 25 is extruded in the same manner as previously described for the embodiment of FIGURE 1. Just prior to release through the orifice 32a, however, the coating of insulating material formed from the charge 41 is forced around the metallic material.

It will be noted from FIGURE 5, that the charge 41 is separated as it flows around the fins 40. However, the pressure at the nozzle 32a is great enough to re-form the material 41 into a substantially uniform coating about the metallic material 25a, and a slender dipole of composite material is extruded and expelled from the vehicle.

In summary, by providing suitable materials as disclosed for extrusion, such as pure indium, and subjecting these to substantial pressure they may be forced through a die at high speed (10–980 ft./sec. depending on pressure) and in the shape of a slender dipole cut to specific resonant length. It has been found that a small pellet of 0.18 diameter and 0.40 inch length can be extruded to a resonant dipole 0.018 inch in diameter and a resonant frequency of 150 mc. By stacking several of these one behind the other and separating them with a parting agent, an entire target group can be extruded by a single thrust of the piston, having the same, or different resonant frequencies.

In addition, larger single targets can be extruded simultaneously or a mix of various dipole lengths can be extruded at a single stroke by varying the sizes of the separated charges.

The additional feature of the invention which provides a dipole of composite material is of extreme importance where targets are to be generated while the vehicle is entering the earth's atmosphere. By employing an insulating material such as a sintered fluorocarbon resin of the type sold under the trade name of Teflon, a dipole is formed which will survive the high temperature condition which accompanies reentry.

From the foregoing, it should be evident that the various objects of the invention are accomplished by providing a method of producing lightweight targets which is unique and simple in operation. Additionally, the invention provides a device which is both lightweight and susceptible of installation in aircraft or space vehicles with a minimum of space required, and relatively little modification to the vehicle.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A method of producing a target in situ for expulsion from an airborne space vehicle or the like which comprises the steps of:
   providing an extruding device having a storage vessel containing a fluid under pressure and having a nozzle with an opening provided therein,
   loading said device with a metallic charge,
   placing said extruding device in a space vehicle with said nozzle opening in communication with the ambient, and
   activating said extruding device in flight by releasing said pressurized fluid to force said metallic charge through said opening to the ambient forming a dipole.

2. A method of producing a target in situ for expulsion from an airborne space vehicle or the like which comprises the steps of:
   providing the vehicle with a target generating device comprising a self-contained power supply and a charge housing in communication with a nozzle,
   loading said charge housing with a metallic charge material, and
   activating the generating device during flight by releasing said supplied power to said charge to extrude said charge through said nozzle forming said charge into a lightweight dipole.

3. A method of producing a target in situ for expulsion from an airborne space vehicle or the like which comprises the steps of:
   providing the vehicle with a target generating device comprising a self-contained power supply and a charge housing in communication with a nozzle,
   loading said charge housing with a metallic charge comprising a plurality of separated pieces of charged material, and
   activating the generating device during flight by releasing said power supply to said charge to extrude said charge through said nozzle forming said charge into a plurality of discrete lightweight dipoles.

4. A method of producing a target in situ for expulsion from an airborne space vehicle or the like which comprises the steps of:
   providing the vehicle with a target generating device comprising a self-contained power supply and a charge housing in communication with a nozzle having a plurality of passages therethrough,
   loading said charge housing with a metallic charge comprising a plurality of separated pieces of charged material, and
   activating the generating device during flight by releasing said power supply to said charge to extrude said charge through said nozzle forming said charge into a plurality of discrete lightweight dipoles.

5. A method of producing a target in situ for expulsion from an airborne space vehicle or the like which comprises the steps of:
   providing the vehicle with a target generating device having a self-contained power supply,
   loading said device with a charge comprising a metallic material and an extrudable insulating material, and
   activating the generating device in flight by releasing said supplied power to said combined metallic and insulating charge to form said charge into a lightweight resonant dipole having a cover of insulating material.

6. A method of producing a target in situ for expulsion from an airborne space vehicle or the like which comprises the steps of:
   providing the vehicle with a target generating device comprising a self-contained power supply and charge housing in communication with a nozzle,
   loading said charge housing with a metallic charge material enveloped by an extrudable insulating material, and
   activating the generating device during flight by releasing said supplied power to said combined metallic and insulating charge to extrude said charge through said nozzle forming said charge into a lightweight dipole having a cover of insulating material.

7. The method described in claim 6 wherein said extrudable insulating material is sintered fluorocarbon resin.

8. The method described in claim 7 wherein said metallic charge material is indium.

9. A device for generating a target from an airborne space vehicle or the like comprising:
   a housing containing a charge of extrudable metallic material, and
   means connected with said housing means for extruding said charge housed therein into a dipole during vehicle flight.

10. A device for generating a target from an airborne space vehicle or the like comprising:
    a charge housing containing a charge of an extrudable material in the interior thereof adapted for installation in a space vehicle,
    a nozzle disposed at one end of said housing and having an opening therein interconnecting the interior of said housing with the ambient,
    means disposed at the opposite end of said housing for extruding said charge material from the interior of said housing through said nozzle opening, and
    means for activating said force producing means during vehicle flight thereby forming a charge of material into a slender dipole and expelling it from the vehicle.

11. A device for generating a target from an airborne space vehicle or the like comprising:
    a charge housing containing a charge of an extrudable material in the interior thereof adapted for installation in a space vehicle,
    a nozzle disposed at one end of said housing and having an opening therein interconnecting the interior of said housing with the ambient,
    a piston disposed adjacent the opposite end of said housing for extruding said charge material from the interior of said housing through said nozzle opening,
    a self-contained power source operatively connected with said piston for applying force through said charge material during vehicle flight, and
    means for activating said power source to apply said force thereby forming a charge of material into a slender dipole and expelling it from the vehicle.

12. A device for generating a target from an airborne space vehicle or the like comprising:
   a charge housing adapted for installation in a space vehicle,
   a nozzle disposed at one end of said housing and having a plurality of openings therein interconnecting the interior of said housing with the ambient,
   a piston disposed adjacent the opposite end of said housing,
   a piston rod connected to said piston and extending into said housing for forcing charge material from the interior of said housing through the plurality of nozzle openings,
   a self-contained power source operatively connected with said piston for applying force through said piston and said connecting rod to said charge material during vehicle flight, and
   means for activating said power supply to apply said force thereby forming a charge of material into a plurality of slender dipoles and expelling them from the vehicle.

13. The structure of claim 12 wherein said self-contained power source comprises a gas under pressure.

14. A device for generating a target from an airborne space vehicle or the like comprising:
   means for housing a charge comprising an extrudable metallic material and an extrudable insulating material, and
   means connected with said housing means for forming said charge housed therein into a metallic dipole having a covering of insulating material, during vehicle flight.

15. A device for generating a target from an airborne space vehicle or the like comprising:
   a charge housing adapted for installation in a space vehicle,
   a nozzle disposed at one end of said housing and having an opening therein interconnecting the interior of said housing with the ambient,
   a piston disposed adjacent the opposite end of said housing,
   a piston rod connected to said piston and extending into said housing for forcing charge material from the interior of said housing through said nozzle opening,
   means in said housing for separating the interior of said housing into a plurality of cylindrical-shaped passages each for housing separate charges of material,
   a self-contained power source operatively connected with said piston for applying force to said piston and said connecting rod to each of said charge materials during vehicle flight, and
   means for activating said power supply to apply said force thereby forming the charges of material into a slender dipole of composite material and expelling it from the vehicle.

16. The structure of claim 15 wherein said means for separating the interior of said housing comprises a tubular member supported axially relative to the interior of said housing, and said piston rod comprises an outer hollow cylindrical portion having its exterior wall adjacent said housing interior wall, and the interior of said hollow cylindrical member adjacent the exterior of said tubular member, and an axial cylindrical portion for interfitting engagement within said tubular member.

References Cited
UNITED STATES PATENTS

| | | | |
|---|---|---|---|
| 3,064,575 | 11/1962 | Schermuly | 343—18 |
| 3,095,973 | 7/1963 | De Buigne | 72—254 |
| 3,143,965 | 8/1964 | La Pointe | 343—18 |
| 3,285,786 | 11/1966 | Katz | 72—258 |

CHARLES W. LANHAM, *Primary Examiner.*

K. C. DECKER, *Assistant Examiner.*

U.S. Cl. X.R.

343—18